(12) United States Patent
Brown et al.

(10) Patent No.: US 7,058,122 B2
(45) Date of Patent: Jun. 6, 2006

(54) REMOTE CUSTOMER PROFILE ADAPTIVE OPERATING SYSTEM

(75) Inventors: Carlton Ligar Brown, Danville, CA (US); G. Keith Cambron, Walnut Creek, CA (US)

(73) Assignee: SBC Properties, L.P., Reno, NV (US)

( * ) Notice: Subject to any disclaimer, the term of this patent is extended or adjusted under 35 U.S.C. 154(b) by 137 days.

(21) Appl. No.: 10/327,753

(22) Filed: Dec. 23, 2002

(65) Prior Publication Data

US 2004/0120390 A1    Jun. 24, 2004

(51) Int. Cl.
*H04B 1/38*    (2006.01)
(52) U.S. Cl. ..................................................... 375/219
(58) Field of Classification Search ................ 455/425, 455/3.04, 3.01–3.03, 403, 423, 422.1; 379/26.01, 379/27.01, 32.04, 1.01, 32.01, 399.01; 370/485, 370/480, 464; 375/224, 228, 219, 220, 221, 375/222
See application file for complete search history.

(56) References Cited

U.S. PATENT DOCUMENTS

| | | | | |
|---|---|---|---|---|
| 4,956,852 A | * | 9/1990 | Hodge | 375/222 |
| 5,513,213 A | * | 4/1996 | Patel et al. | 375/222 |
| 5,683,432 A | * | 11/1997 | Goedeke et al. | 607/32 |
| 5,867,494 A | * | 2/1999 | Krishnaswamy et al. | 370/352 |
| 6,151,335 A | | 11/2000 | Ko et al. | |
| 6,163,599 A | * | 12/2000 | McHale | 379/93.28 |
| 6,219,378 B1 | * | 4/2001 | Wu | 375/231 |
| 6,246,695 B1 | | 6/2001 | Seazholtz et al. | |
| 6,285,708 B1 | | 9/2001 | Shively et al. | |
| 2001/0030998 A1 | | 10/2001 | Yong | |
| 2003/0156691 A1 | * | 8/2003 | Rahamim | 379/93.28 |
| 2003/0190937 A1 | * | 10/2003 | Karmi et al. | 455/574 |

FOREIGN PATENT DOCUMENTS

| | | |
|---|---|---|
| FR | 2697392 | 4/1994 |
| SU | 1363-491 | 12/1987 |

\* cited by examiner

*Primary Examiner*—Pankaj Kumar
(74) *Attorney, Agent, or Firm*—Toler Schaffer, LLP

(57) ABSTRACT

A remote customer profile adaptive operating system (10) for use in a digital subscriber line telecommunication network (12) is provided. The system (10) includes a customer site (16) in communication with a remote terminal (20). The customer site (16) has a customer profile. The remote terminal (20) includes a main controller (32) that has a customer profile monitor (50) that monitors at least one customer performance parameter. A comparator (52) compares the customer performance parameters to at least one associated customer performance standard and generates a customer difference signal. A customer profile adjuster (54) modifies the customer profile remotely in response to the customer difference signal. A method of performing the same is also provided.

13 Claims, 2 Drawing Sheets

REMOTE CUSTOMER PROFILE ADAPTIVE OPERATING SYSTEM

TECHNICAL FIELD

The present invention relates generally to data transmission systems, and more particularly, to a method and system for adaptively and remotely adjusting a customer profile from a remote location.

BACKGROUND OF THE INVENTION

Demand for high-speed data transmission is ever increasing. Internet access, electronic commerce, Internet protocol telephony, and videoconferencing are examples of some telecommunication based medium that require such a demand.

Digital subscriber line (DSL) technology provides high-speed data transmission over a so-called "last mile" of "local loop" of a telephone network via twisted copper wire between residential and small business sites and telephone company central offices. There are various types of DSL such as asymmetric DSL, high bit-rate DSL, single-line DSL, very-high-data-rate DSL, integrated services digital network (ISDN) DSL, and rate-adaptive DSL having various transmission rates, switched circuit characteristics, and other known operation characteristics. These are collectively referred to as xDSL technologies.

In a simplified general view, a DSL system may be considered as a pair of communicating modems, one of which is located at a home or office computer, and the other of which is located at a network control site, typically at a telephone company central office. The central office modem is connected to some type of network, usually referred to as a backbone network, which is in communication with other communication paths by way of routers or digital subscriber line access multiplexers (DSLAMs). Through DSLAMs the backbone network is able to communicate with dedicated information sources and with the Internet. As a result, information accessible to the backbone network may be communicated between the central office modem and a customer site modem.

Typically, in order to install a new customer modem within a telephone network to a central office modem requires two truck rolls or technician visits to customer sites. A first truck roll is performed by a mass-market technician who validates a synchronous communication rate between the customer modem and the central office modem. A second truck roll is performed by a data communication technician who installs a splitter/microfilter and a customer premises equipment (CPE) or modem, and configures a customers personal computer to have a designated customer profile. There is a desire to minimize the number of truck rolls to increase the number of modem installations possible within a specified time frame and to decrease costs involved in installation.

A customer profile or a xDSL service profile includes a customer modem communication rate with the central office. The central office provides an allowable communication rate for each customer, which is separate from and distinctly different than a customer capable communication rate. The customer capable communication rate is typically a modem rated communication rate, whereas the customer allowable transmission rate is set by the central office and may be manually adjusted as needed. The customer allowable transmission rate may be slower or faster than the customer capable communication rate.

Additionally, customer line instability upon initial startup has caused an increased number of truck rolls. A maximum allowable communication rate is initially provided to a customer line. As the customer line is in operation when instability occurs the customer allowable communication rate is manually reduced to account for the instability issues. The instability may be due to noise or undesired signal interference. Each instance that the customer allowable communication rate is reduced an additional truck roll is performed.

Furthermore, to modify a customer profile, similar to when post installation instability issues occur, an additional truck roll is required. When a customer site is experiencing frequent signal-to-noise errors, or is not operating at a preferred data transmission rate, a technician is then dispatched to the customer site to change the customer profile. A customer may also request the customer allowable transmission rate be changed when the customer notices the customer line frequently being out of sink or experiencing data transmission errors.

It would therefore be desirable to develop a DSL communication system that is capable of setting and adjusting customer profiles while at the same time minimizing the number of truck rolls and allowing more customers to have error-free service when initially connected.

DETAILED DESCRIPTION OF THE PREFERRED EMBODIMENT

Figure 1:
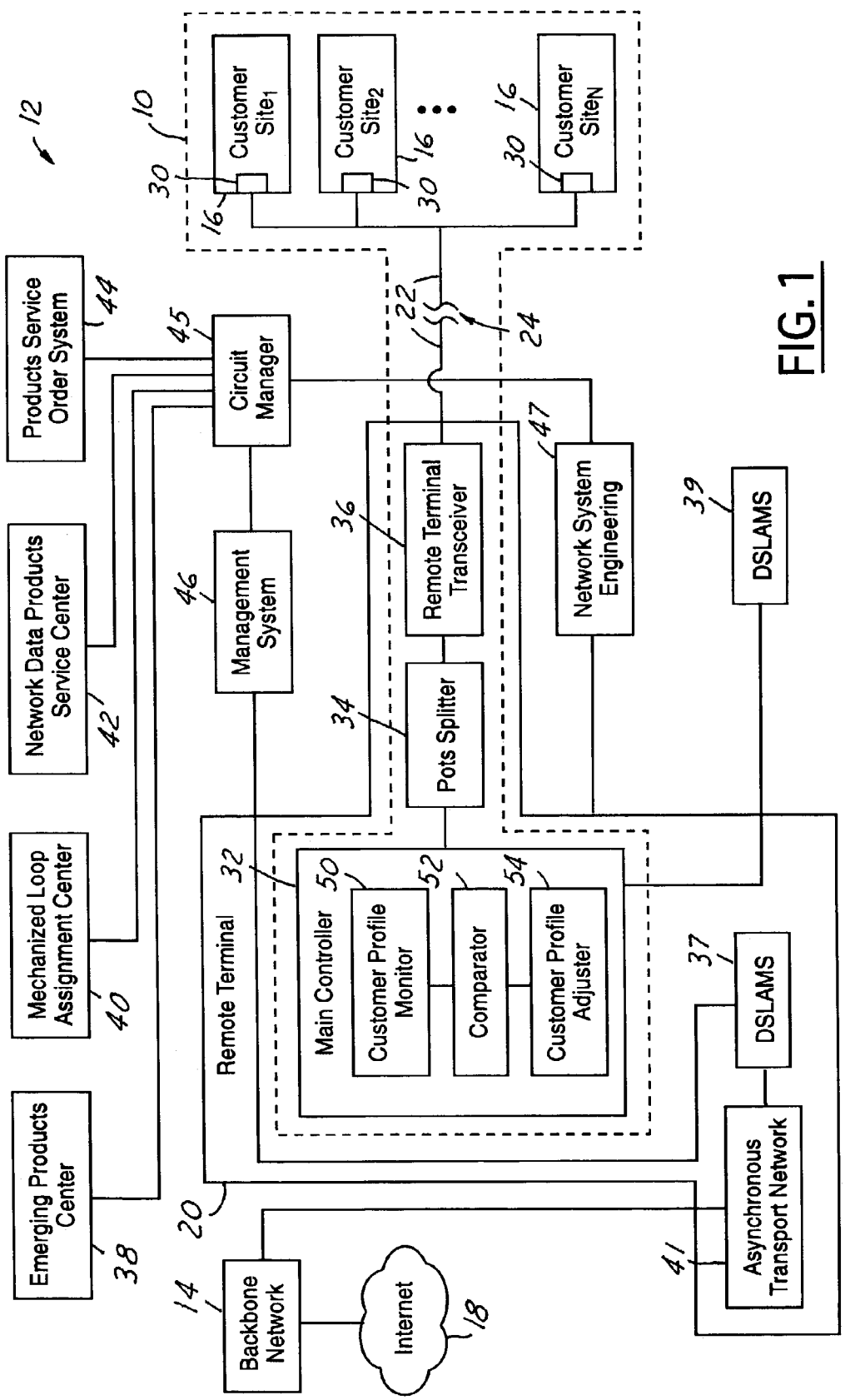
FIG. 1 is a remote customer profile adaptive operating system for use in a digital subscriber line telecommunication network in accordance with an embodiment of the present invention.

While the present invention is described with respect to a method and apparatus for adaptively and remotely adjusting a customer profile from a remote location, the present invention may be adapted to be used in various systems including: telecommunication systems, digital subscriber line (DSL) systems, high-speed data transmission systems, or other communication systems.

In the following description, various operating parameters and components are described for one constructed embodiment. These specific parameters and components are included as examples and are not meant to be limiting.

Also, in the following description the term "transceiver" generally refers to any communication transceiver or system containing a communication transceiver including a modem, a phone, a splitter in combination with a modem, a computer, a satellite, or other transceiver known in the art.

The present invention provides a method and network for adaptively and remotely adjusting a customer profile from a remote location without human intervention. A remote customer profile adaptive operating system for use in a DSL telecommunication network is provided. The system includes a customer site and a remote terminal. The customer site has a customer profile and includes customer premises equipment that receives and transmits communication signals to the remote terminal. The remote terminal includes a remote terminal transceiver in communication with the customer premises equipment and a main controller electrically coupled to the remote terminal transceiver. The main controller includes a customer profile monitor that monitors at least one customer performance parameter. A comparator compares the customer performance parameters to at least one associated customer performance standard and generates a customer difference signal. A customer profile adjuster modifies the customer profile remotely in response to the customer difference signal.

One of several advantages of the present invention is that it provides an adaptive operating system for remotely adjusting customer profiles with no human intervention. In so doing, the present invention minimizes truck rolls in setting up a customer site and in further adjusting the customer profile, and allows the customer site to operate upon installation with minimum operating errors.

Another advantage of the present invention is that it efficiently provides a customer site with an allowable communication rate that is approximately equal to a communication rate for which a customer terminal ideally exhibits minimum signal-to-noise ratio, minimum attenuation, minimum errors, and maximum line capacity.

Furthermore, the present invention also provides continuous customer profile adjustment without traditional time delay associated with truck rolls and manual adjustment of a customer profile.

Other advantages and features of the present invention will become apparent when viewed in light of the following description when taken in conjunction with the attached drawings and appended claims.

Referring now to FIG. 1, a remote customer profile adaptive operating system 10 for use in a DSL telecommunication network 12 in accordance with an embodiment of the present invention is shown. The DSL network 12 includes a backbone network 14 and multiple customer sites 16. The DSL network 12 routes DSL communication signals between the backbone network 14 and the customer sites 16. The backbone network 14 may be electrically coupled to the Internet 18 and is electrically coupled to at least one remote terminal 20, which, in turn, is electrically coupled to the customer sites 16, via cables 22. The customer sites 16 may be long distances from the remote terminals 20, which is represented by break 24. The cables 22 may be twisted wire pair cable, fiber optic cable, or other cable known in the art.

The adaptive operating system 10 includes customer sites 16 having customer premises equipment 30, which may include a modem, a splitter, a network interface card, or other customer premises equipment known in the art. The customer premises equipment 30 is in communication with a main controller 32 of the remote terminal 20 via a pots splitter 34 and a remote terminal transceiver 36. The customer premises equipment 30 has an associated customer profile. The customer profile includes various customer performance parameters such as an operating code, a signal-to-noise ratio, a line capacity, an attenuation value, an error rate, and other performance parameters known in the art. The adaptive operating system 10 provides remote customer profile adjustment without the need for a truck roll.

The customer sites 16 may be residential or commercial sites. Each customer site 16 has an associated line that may be included in a line table. Each customer site may perform numerous associated customer events for a specified time period, which may be reviewed by accessing the customer site associated line in the line table. The line table contains customer site lines for which customer performance parameters are to be reviewed.

The remote terminals 20 may be central offices or other form of remote terminals known in the art. The remote terminals 20 may be located in a suburban/rural environment or may be located in a more urban environment. The remote terminals 20 may contain DSL access multiplexer (DSLAM) equipment 37, be electrically coupled to external DSLAMs 39, or a combination thereof, to provide DSL service. The DSLAMs 37 and 39 may be coupled to the backbone network 14 via an asynchronous transport network 41, as known in the art. The remote terminals 20 may be complex in that they have several service centers and systems or may be as simple as a single computer in a remote location.

In one embodiment of the present invention, the remote terminals 20 include the main controller 32, which is electrically coupled to an emerging products center 38, a mechanized loop assignment center 40, a network data products service center 42, and a product service order system 44, via a circuit manager 45. The main controller 32 is electrically coupled to a management system 46, via DSLAMs 37, and network system engineering 47. The management system 46 and network system engineering 47 are electrically coupled to the circuit manager 45. The main controller 32 is a regional device but may be at a single central office or remote terminal location. The circuit manager 45, the management system 46, network system engineering 47, the products center 38, the assignment center 40, the service center 42, and the order system 44 are also regional and may be at locations other than a central office or location of the remote terminal 20.

The main controller 32 includes a customer profile monitor 50, a comparator 52, and a customer profile adjuster 54 (all software based). The main controller 32 is preferably microprocessor-based such as a computer having a central processing unit, memory (RAM and/or ROM), and associated input and output buses. The main controller 32 may also be in the form of a workstation, such as, for example, a Sun Workstation. The main controller 32, the profile monitor 50, the comparator 52, and the customer profile adjuster 54 may be integrally part of a single unit, as shown, or may each be separate stand-alone devices. The main controller may also be electrically coupled to various DSLAMs and servers, as shown. The main controller 32 monitors the customer performance parameters over time and remotely adjusts the customer profiles accordingly. The functions of the profile monitor 50, the comparator 52, and the customer profile adjuster 54 are discussed in further detail below.

The management system 45 is a management system for the DSLAMs 37 and 39. The management system 45 may be an Alcetal management system or other management system known in the art. The management system 45 provides operating system provisioning, as known in the art.

The circuit manager 46 is a customer service manager containing customer information including customer site information and customer profiles. The circuit manager 46 limits provisioning and direct access on and to DSLAMs 37 and 39.

Network system engineering 47 reviews customer records for validity and reviews results from the main controller 32 for processing.

The products center 38 is a sales center that handles provisioning customer calls regarding a DSL product. When a customer inquiry is received, a service representative gathers necessary information for qualification and order processing and checks for product availability in the remote terminal 20. DSLAM port availability is checked for the remote terminal 20 and customer loop link is verified to be within a specified range from the remote terminal 20. The products center 38 receives customer information such as name and address and customer order information and initiates processing of the information. The products center 38 also receives customer guidelines for installation of the customer premises equipment 30.

The assignment center 40 is responsible for assigning facilities to provision a customer service. The assignment center 40 inventories and assigns remote facilities of the remote terminals 20.

The service center 42 provides technical channel setup to handle provisioning of data products. The service center 42 performs maintenance of DSLAM equipment and installation of DSL service.

The order system 44 interacts with various back end systems to verify that equipment is available to serve a specific customer location. Pre-ordering applications is enabled by a sales channel representative for xDSL service. The order system 44 verifies that equipment is in place to serve a customer at a specific location, collects preorder information from telephone company databases through telephone company preorder interfaces, and sends such information through other local exchange carrier systems in order to process a customer request for service.

Figure 2:
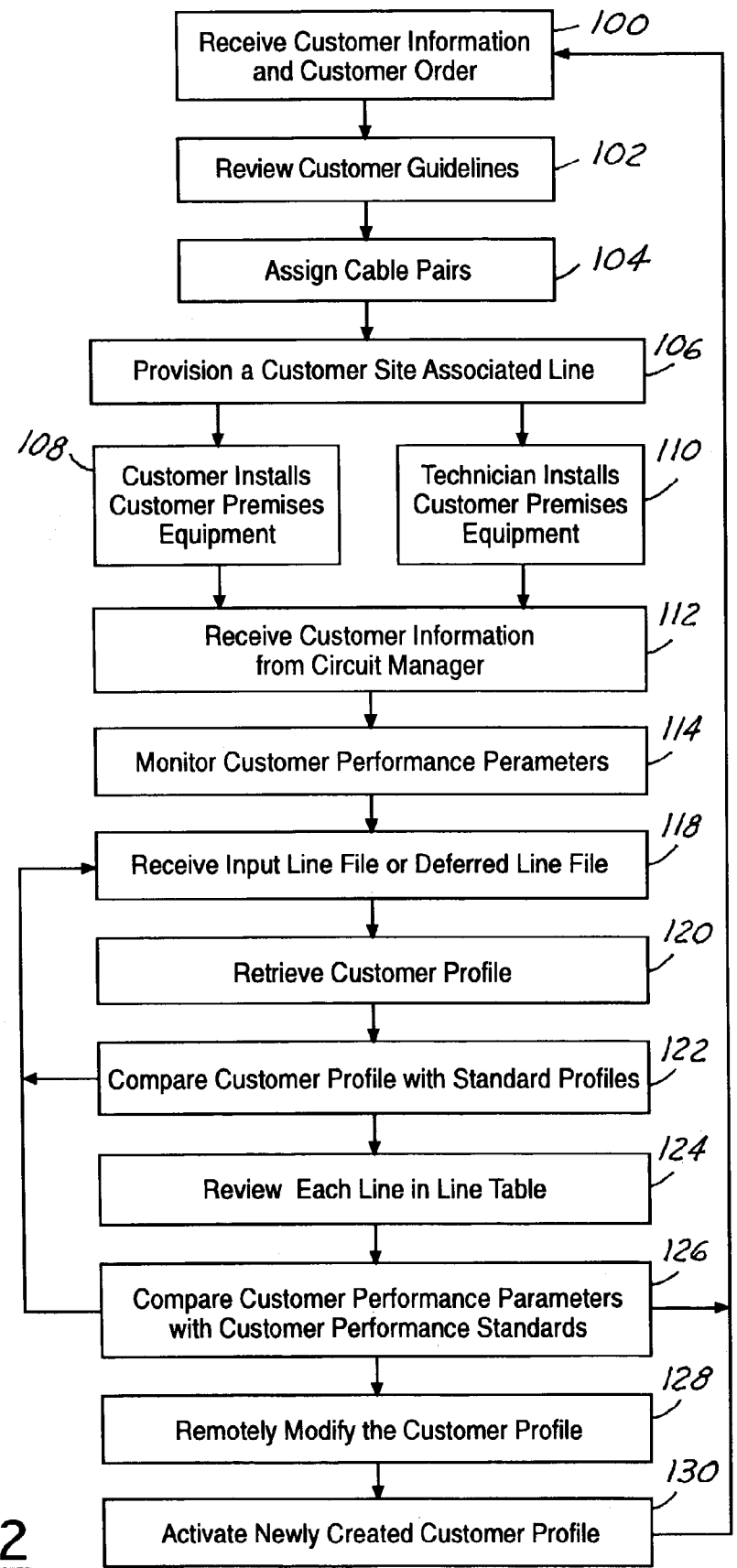
FIG. 2 is a logic flow diagram illustrating a method of adaptively and remotely adjusting a customer profile within a digital subscriber line telecommunication network in accordance with an embodiment of the present invention.

Referring now to FIG. 2, a logic flow diagram illustrating a method of adaptively adjusting a customer profile within the DSL telecommunication network 12 in accordance with an embodiment of the present invention is shown.

In step 100, the products center 38 receives customer information and a customer order as described above. A customer may be a current customer with an active account, a previous customer with an inactive account, or may be a new customer. An installation may be requested or an adjustment may be requested to a current customer profile, in either situation, customer guidelines are provided by the customer.

In step 102, the customer guidelines are reviewed and the adaptive operating system 10 determines whether the customer qualifies for a self-install. When the customer does qualify for a self-install steps 104–108 are performed, otherwise steps 104, 106, and 110 are performed.

In step 104, the assignment center 40 assigns cable pairs to a DSLAM to be associated with a customer site 16.

In step 106, the service center 42 provisions a customer site associated line, and a customer profile is provisioned or created in response to customer guidelines.

In step 108, the customer initiates setup of the customer site by proceeding to install the customer premises equipment 30. An initial customer allowable transmission rate is established.

In step 110, a technician initiates setup of the customer site 16 by installing the customer premises equipment 30. A customer profile is created in response to the customer guidelines. An initial customer allowable transmission rate is also established.

In step 112, customer information including the customer profile is received from the circuit manager 45.

In step 114, the customer profile monitor 50 monitors, for example, four customer performance parameters including margin, capacity, code violation, and error seconds. The customer profile monitor 50 may utilize software such as ADSL engineering performance tool (ADEPT) software, to retrieve the customer performance parameters from the customer premises equipment 30. In one embodiment of the present invention, the customer performance parameters are monitored during off-peak hours such as each evening.

In step 118, an input line file or a deferred line file is received. The input line file is received containing an input line table for many customer site lines from the order system 44. The deferred line file is reviewed from step 126 below. The line table is utilized by the comparator 52 in evaluating customer performance parameters.

In step 120, the main controller retrieves a customer profile for the customer site of interest.

In step 122, the main controller 32 compares the customer profile with standard profiles. When the customer profile matches a standard profile, step 124 is performed, otherwise an error is generated and the main controller 32 reverts back to step 118.

In step 124, each line in the line table is reviewed. A virtual channel and a virtual path are determined for each line.

In step 126, the comparator 52 compares the customer performance parameters with the customer performance standards, for each line, to generate the customer difference signal. A customer performance standard exists for each customer performance parameter including an operating code standard, a signal-to-noise ratio standard, a line capacity standard, an attenuation standard, and an error rate standard. For example, signal-to-noise ratio associated with a customer site 16 is compared with a noise margin profile code to determine whether a violation has occurred. When a customer site line is busy, a deferred line file is generated and the main controller 32 reverts to step 118. When a violation has occurred, an associated line is marked. When a violation does not exist the main controller 32 returns to step 100, to retrieve a customer order, or step 118, to recheck the customer performance parameters. A customer site line may be deleted or removed including an associated virtual channel and a virtual path when the line is no longer in service.

In step 128, when a line is marked, the customer profile adjuster 54 modifies the corresponding customer profile remotely in response to the customer difference signal. When the customer difference signal is above a predetermined value or a customer performance standard has been exceeded, the customer profile is adjusted. For example, when the signal-to-noise ratio margin is less than 6 db with error seconds, corresponding to a difference signal being above a predetermined value, than the customer profile adjuster reduces the customer allowable transmission rate. In another example, when the customer site 16 is experiencing a large amount of data errors, such that the error rate is above a predetermined value, the customer allowable transmission rate may be reduced to minimize the amount of data errors.

In step 130, a newly created customer profile is activated. The customer premises equipment installation is complete. Also, upon adjusting the customer profile the associated customer site line where a violation occurred is removed from the line table along with the virtual channel and virtual path corresponding to that line. The customer profile is reset and a newly created profile is activated. The main controller 32 proceeds to return to step 100.

The customer profile adjuster 54 may increase a customer allowable transmission rate with the remote terminal 16 when the customer performance parameters remain less than (well within) the corresponding customer performance standards for a predetermined amount of time.

The customer site 16 may generate a customer allowed transmission rate adjustment request signal to increase or decrease the customer allowable transmission rate. The main controller 32 may adjust the customer allowed transmission rate in response to the customer allowed transmission rate adjustment request signal.

The above-described steps are meant to be an illustrative example, the steps may be performed synchronously or in a different order depending upon the application.

The present invention provides an adaptive operating system that is capable of remotely adjusting a customer profile including a customer allowable transmission rate. The present invention thereby minimizes and potentially eliminates a need for truck rolls to install customer premises equipment or to adjust a customer profile. The present invention also maximizes transmission of communication signals between customer sites and central offices while minimizing noise and error rate.

The above-described apparatus, to one skilled in the art, is capable of being adapted for various purposes and is not limited to the following systems: telecommunication systems, DSL systems, high-speed data transmission systems; or other communication systems. The above-described invention may also be varied without deviating from the spirit and scope of the invention as contemplated by the following claims.

What is claimed is:

1. A remote customer profile adaptive operating system for use in a digital subscriber line telecommunication network comprising:
    at least one customer site having at least one customer profile and comprising customer premises equipment receiving and transmitting communication signals; and
    at least one remote terminal remotely located from said at least one customer site comprising:
        a remote terminal transceiver in communication with said customer premises equipment; and
        a main controller electrically coupled to said remote terminal transceiver comprising:
            a customer profile monitor monitoring at least one customer performance parameter;
            a comparator comparing said at least one customer performance parameter to at least one associated customer performance standard and generating a customer difference signal; and
            a customer profile adjuster modifying said at least one customer profile remotely in response to said customer difference signal;
        wherein said customer profile monitor in monitoring at least one customer performance parameter monitors at least one of a signal-to-noise ratio, a line capacity, an attenuation, or an error rate.

2. A system as in claim 1 wherein said customer profile adjuster in modifying said customer profile remotely modifies a customer profile when said customer difference signal is above a predetermined value.

3. A system as in claim 1 wherein said customer profile adjuster reduces a customer allowed transmission rate to said at least one remote terminal when said at least one customer performance standard has been exceeded.

4. A system as in claim 1 wherein said main controller further comprises software which is utilized to retrieve said at least one customer performance parameter from said customer premises equipment.

5. A system as in claim 1 wherein said at least one customer site generates a plurality of customer guidelines and said main controller adjusts said at least one customer performance parameter in response to said plurality of customer guidelines.

6. A system as in claim 5 wherein said main controller initiates set up of said at least one customer site in response to said plurality of customer guidelines.

7. A remote customer profile adaptive operating system for use in a digital subscriber line telecommunication network comprising:
    at least one customer site having at least one customer profile and comprising customer premises equipment, of the digital subscriber line telecommunication network, receiving and transmitting communication signals; and
    at least one remote terminal remotely located from said at least one customer site comprising;
        a remote terminal transceiver in communication with said customer premises equipment; and
        a main controller electrically coupled to said remote terminal transceiver comprising;
            a customer profile monitor monitoring at least one customer performance parameter;
            a comparator comparing said at least one customer performance parameter to at least one associated customer performance standard and generating a customer difference signal; and
            a customer profile adjuster modifying said at least on customer profile remotely in response to said customer difference signal;
        wherein said comparator in comparing said at least one customer performance parameter compares at least one associated customer performance standard comprising a signal-to-noise ratio standard, a line capacity standard, an attenuation standard, or an error rate standard.

8. A remote customer profile adaptive operating system for use in a digital subscriber line telecommunication network comprising:
    at least one customer site having at least one customer profile and comprising customer premises equipment of the digital subscriber line telecommunication network, receiving and transmitting communication signals; and
    at least one remote terminal comprising;
        a remote terminal transceiver in communication with said customer premises equipment; and
        a main controller electrically coupled to said remote terminal transceiver comprising;
            a customer profile monitor monitoring at least one customer performance parameter;
            a comparator comparing said at least one customer performance parameter to at least one associated customer performance standard and generating a customer difference signal; and
            a customer profile adjuster modifying said at least one customer profile remotely in response to said customer difference signal;
        wherein said customer profile adjuster increases a customer allowable transmission rate to said at least one remote terminal when said at least one customer performance parameter remains less than said at least one customer performance standard for a predetermined amount of time.

9. A remote customer profile adaptive operating system for use in a digital subscriber line telecommunication network comprising:
    at least one customer site having at least one customer profile and comprising customer premises equipment receiving and transmitting communication signals; and
    at least one remote terminal remotely located from said at least one customer site comprising;
        a remote terminal transceiver in communication with said customer premises equipment; and a main controller electrically coupled to said remote terminal transceiver comprising;
a customer profile monitor monitoring at least one customer performance parameter;
a comparator comparing said at least one customer performance parameter to at least one associated customer performance standard and generating a customer difference signal; and
a customer profile adjuster modifying said at least one customer profile remotely in response to said customer difference signal;
wherein said at least one customer site generates a customer allowed transmission rate adjustment request signal and said main controller adjusts said customer allowed transmission rate in response to said customer allowed transmission rate adjustment request signal.

10. A method of adaptively adjusting a customer profile within a digital subscriber line telecommunication network comprising:
monitoring at least one customer performance parameter of customer premise equipment comprising monitoring at least one of an operating code, a signal-to-noise ratio, a line capacity, an attenuation, and an error rate;
comparing said at least one customer performance parameter to at least one associated customer performance standard and generating a customer difference signal;
modifying said customer profile of customer premise equipment remotely in response to said customer difference signal;
reducing a customer allowed transmission rate to a remote terminal when said at least one customer performance standard has been exceeded; and
increasing a customer allowable transmission rate to a remote terminal when said at least one customer performance parameter remains less than said at least one customer performance standard for a predetermined amount of time.

11. A method of adaptively adjusting a customer profile within a digital subscriber line telecommunication network, having at least one customer site and a remote terminal in communication with the at least one customer site, comprising:
monitoring at least one customer performance parameter, comprising monitoring at least one of an operating code, a signal-to-noise ratio, a line capacity, an attenuation, and an error rate;
comparing said at least one customer performance parameter to at least one associated customer performance standard and generating a customer difference signal;
modifying said customer profile remotely in response to said customer difference signal; and
generating a plurality of customer guidelines at a customer products center, receiving said plurality of customer guidelines via the remote terminal, and adjusting said at least one customer performance parameter remotely in response to said plurality of customer guidelines.

12. A method as in claim 11 further comprising initiating set up of a customer site in response to said plurality of customer guidelines.

13. A method of adaptively adjusting a customer profile within a digital subscriber line telecommunication network comprising:
generating a plurality of customer guidelines at a customer products center;
receiving said plurality of customer guidelines via a central office terminal;
initiating set up of a customer site in response to said plurality of customer guidelines;
monitoring at least one customer performance parameter upon set up of said customer site, comprising monitoring at least one of an operating code, a signal-to-noise ratio, a line capacity, an attenuation, and an error rate;
comparing said at least one customer performance parameter to at least one associated customer performance standard and generating a customer difference signal; and
modifying said customer profile remotely in response to said customer difference signal by reducing a customer allowed transmission rate to a remote terminal when said at least one customer performance standard has been exceeded.

* * * * *